(12) United States Patent
Haghayegh

(10) Patent No.: US 7,621,223 B2
(45) Date of Patent: Nov. 24, 2009

(54) CORNER SHELF SYSTEM

(76) Inventor: Alireza Haghayegh, 12721 NW. 7th Ave., Miami, FL (US) 33168

( * ) Notice: Subject to any disclaimer, the term of this patent is extended or adjusted under 35 U.S.C. 154(b) by 0 days.

(21) Appl. No.: 11/868,218

(22) Filed: Oct. 5, 2007

(65) Prior Publication Data
US 2009/0090683 A1    Apr. 9, 2009

(51) Int. Cl.
A47B 23/00    (2006.01)
(52) U.S. Cl. ........................................ 108/42
(58) Field of Classification Search .................. 108/42; 248/220.1; 211/90.01; 312/238
See application file for complete search history.

(56) References Cited

U.S. PATENT DOCUMENTS

| | | | | |
|---|---|---|---|---|
| 2,368,285 A | * | 1/1945 | Bullard | 312/238 |
| 2,522,442 A | * | 9/1950 | Garris | 108/42 |
| 3,401,961 A | * | 9/1968 | Mitchell et al. | 52/127.5 |
| 4,708,310 A | * | 11/1987 | Smith | 248/220.1 |
| 5,340,070 A | * | 8/1994 | Soma | 248/220.1 |
| 5,588,370 A | * | 12/1996 | Longley | 108/42 |
| 6,591,762 B1 | | 7/2003 | Haghayegh | 108/42 |
| 6,615,745 B2 | * | 9/2003 | Cinkaj | 108/152 |
| 2003/0136310 A1 | * | 7/2003 | Bouffard | 108/42 |
| 2005/0005824 A1 | * | 1/2005 | McLemore | 108/42 |
| 2005/0040124 A1 | * | 2/2005 | Fontana et al. | 211/90.01 |
| 2007/0001073 A1 | * | 1/2007 | Gibson | 248/220.1 |

FOREIGN PATENT DOCUMENTS

EP            447316    *    9/1991    .................. 108/42

* cited by examiner

*Primary Examiner*—Hanh V Tran
(74) *Attorney, Agent, or Firm*—Sanchelima & Assoc., P.A.

(57) ABSTRACT

A shelf system for corner walls where the shelf members are supported against two perpendicularly disposed walls without showing any mounting elements. The shelf member includes at least two contiguous sides defining edges of a predetermined thickness and perpendicular to each other. Tongue members extend for the sides and are receivable within cooperative wall cavities for a snug mechanical engagement. Adhesive is applied to the sides to immobilize the shelf member and thus enhance the structured integrity of the system.

4 Claims, 2 Drawing Sheets

CORNER SHELF SYSTEM

I. BACKGROUND OF THE INVENTION

1. Field of the Invention

The present invention relates to a corner shelf system, and more particularly, to such a system that conceals its supporting members.

2. Description of the Related Art

Several designs for a corner shelf system have been designed in the past. None of them, however, includes a shelf member with a peripheral edge including tongues that penetrates the corner surfaces to which the shelf member is mounted.

Applicant believes that the closest reference corresponds to U.S. Pat. No. 6,591,762 issued to the inventor on Jul. 15, 2003 for a corner shelf assembly. However, it differs from the present invention because it requires the use of casing members and the tongue members need to be slid horizontally. The present invention, on the other hand, secures the shelf member in place by using a strong adhesive that binds the peripheral edge to the corner walls' surfaces, preventing its movement, which the tongue members snuggly fit within cooperating openings in the walls' surfaces to support most of the vertical load.

Other patents describing the closest subject matter provide for a number of more or less complicated features that fail to solve the problem in an efficient and economical way. None of these patents or any other references known to applicant suggest the novel features of the present invention.

II. SUMMARY OF THE INVENTION

It is one of the main objects of the present invention to provide a corner shelf system that conceals its supporting mechanisms.

It is another object of this invention to provide a corner shelf system that is strong enough to support objects.

It is still another object of the present invention to provide a corner shelf system that can be readily mounted to and in the walls of a corner.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

III. BRIEF DESCRIPTION OF THE DRAWINGS

With the above and other related objects in view, the invention consists in the details of construction and combination of parts as will be more fully understood from the following description, when read in conjunction with the accompanying drawings in which.

IV. DETAILED DESCRIPTION OF THE PREFERRED EMBODIMENT

Figure 1:
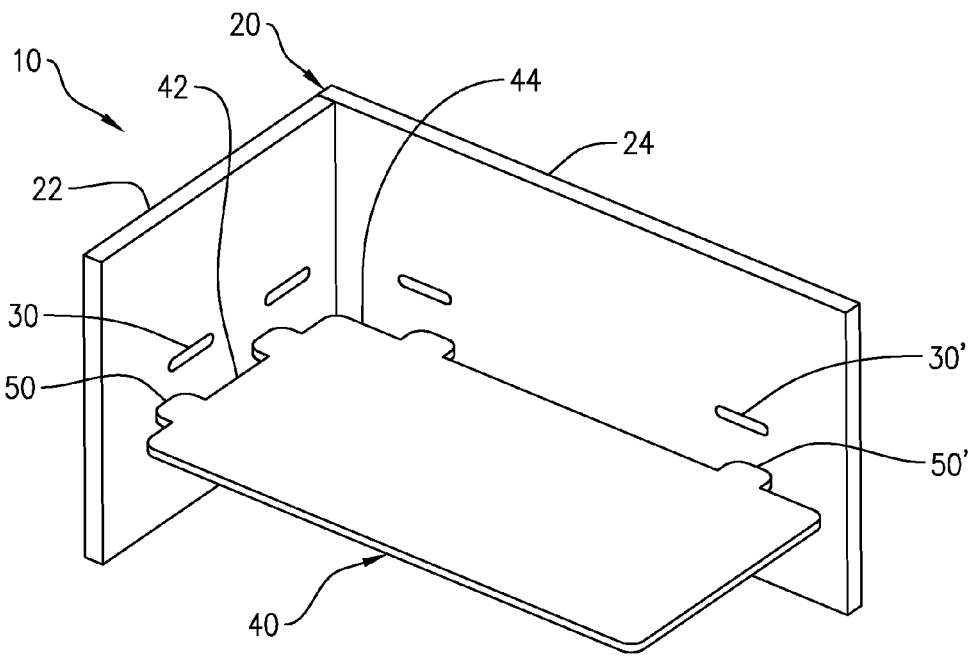
FIG. 1 represents an isometric view of a shelf system incorporating the present invention, as the shelf is being installed.
Figure 1A:
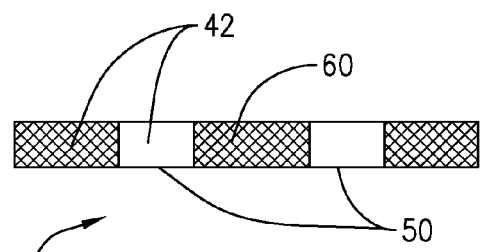
FIG. 1A is an elevational view showing the application of adhesive 60 along the edge of shelf member 40.
Figure 2:
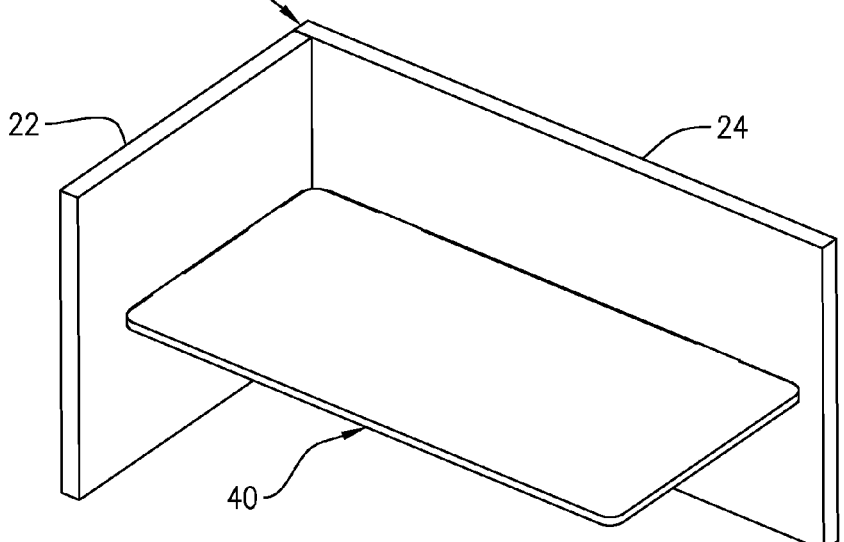
FIG. 2 shows an isometric view of the shelf system installed.

Referring now to the drawings, where the present invention is generally referred to with numeral 10, it can be observed that it basically includes corner wall 20 with cavities 30, 30', shelf member 40 with tongue members 50, 50' snuggly insertable inside cavities 30, 30', and adhesive 60 applied to edges 42 and 44 of member 40, as it can be seen in FIGS. 1 and 2.

FIG. 1 shows shelf member 40 as it is being mounted, with tongue members 50 being lined up with cavities 30. Cavities 30 on wall 22 may be slightly longer than cavities 30' in wall 24 so that tongue member 50 can be first inserted inside cavity 30. Subsequently, tongue members 50' will be pushed through openings 32 and into cavities 30' for a snug fit. Either cavity 30 or cavity 30', or both, need to be slightly longer than the width of tongue member 50 and/or 50'.

Figure 3:
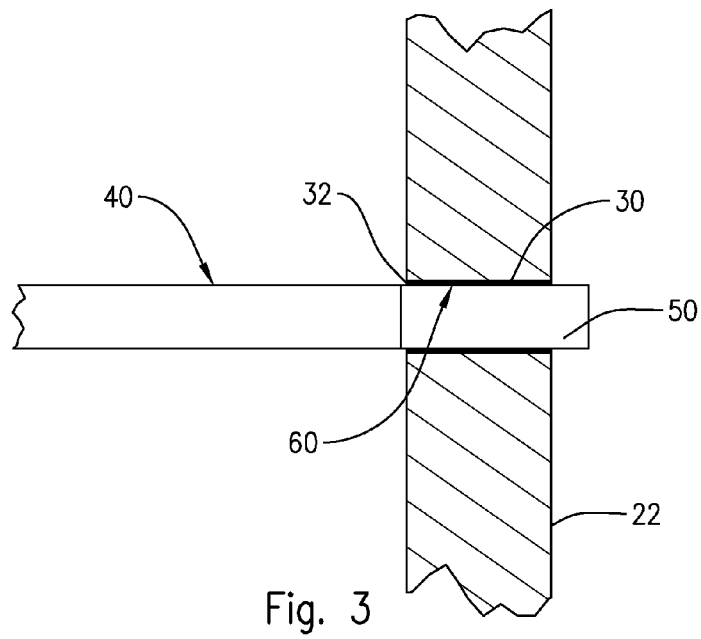
FIG. 3 is a representation of an elevation cross-section of a tongue member inserted inside a cavity.
Figure 4A:
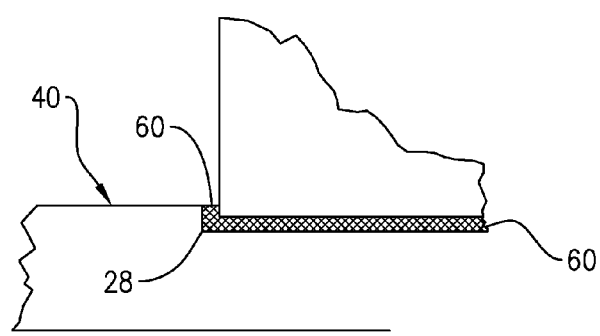
FIG. 4A is a detail elevational view of step 28 shown in FIG. 4.
Figure 4:
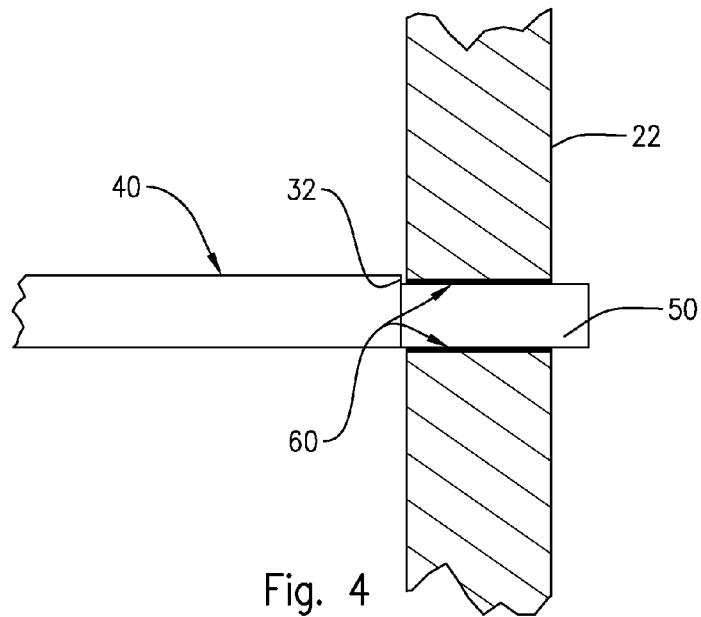
FIG. 4 is a representation of an elevational cross-section of a tongue member, with a step, inserted inside a cavity.

As seen in FIGS. 3 and 4, tongue member 50 penetrates through opening 32 into cavity 30 on one side of wall 22 for a snug fit. Adhesive 60 is applied to the edges of shelf member 40 that are brought in contact with wall 22 and 24. Adhesive 60 can be an acrylic adhesive caulking or equivalent that immobilizes shelf member 40 counteracting any shear forces; vertically (from the load) and horizontally (to prevent lateral movements that would disengage tongue member 50).

Shelf member 40 has, in the preferred embodiment, a substantial uniform thickness. Tongue members 50 and 50', in another preferred embodiment, may have a slightly smaller thickness so that step 28 is defined. Step 28 can be defined with the upper side and/or underside. FIG. 4 shows step 28 on the upper side. The object is to position step 28 so that it covers the upper portion of opening 32 of cavity 30 as seen in FIG. 4A.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A shelf system for corner walls, comprising:
   A) a substantially flat shelf member having at least two contiguous sides defining first and second edges of a predetermined thickness and perpendicular to each other, said first and second edges each including at least one tongue member that extends coplanarly outwardly a predetermined distance, said at least one tongue member having a slightly smaller thickness than said first and second edges thereby defining a step between said shelf member and said tongue member,
   B) a corner wall having first and second walls perpendicular to each other and said first and second walls including in each of said first and second walls at least one cavity for each of said at least one tongue member, and each of said at least one cavity being cooperatively located to receive one of said tongue members and each of said at least one cavity including an opening through which said tongue member passes and is snuggly received within said cavity, one of the cavities on one of said first wall or second wall having cooperative dimensions to permit lateral movement of said tongue member within said cavity where said tongue member is first inserted; and C) adhesive means applied to said first and second edges and to said at least one tongue member for rigid affixation of said shelf member to said first and second walls respectively, upon contact preventing lateral movement of said shelf member to insure the tongue member and said at least one cavity stay engaged; so that said shelf member is capable of supporting loads of a predetermined magnitude.

2. The system set forth in claim 1 wherein said step curving in abutting contact with the wall adjacent to said cavity thereby concealing the latter.

3. The system set forth in claim 2 wherein said first and second edges include, each, two tongue members.

4. The system set forth in claim 3 wherein said adhesive means is applied to said tongue members.

* * * * *